United States Patent Office 2,965,468
Patented Dec. 20, 1960

2,965,468

HIGH NITROGEN PLANT FOOD

Derrick H. Stassfort, Calumet City, and Everett N. Mortenson, Chicago, Ill., and Marion Dwight Sanders, Chesterton, Ind., assignors to Swift & Company, Chicago, Ill., a corporation of Illinois No Drawing. Filed Apr. 1, 1955, Ser. No. 498,742

3 Claims. (Cl. 71—36)

This invention relates in general to the manufacture of mixed fertilizers containing substantial amounts of nitrogen. More particularly, the invention relates to nitrogen containing fertilizers wherein a major proportion of this element is derived from ammonia-ammonium nitrate solutions.

In the fertilizer industry, one of the most commonly used nitrogen supplying substances is a solution of ammonia-ammonium nitrate. This is prepared by oxidizing anhydrous ammonia to nitric acid, thereafter forming ammonium nitrate by neutralization of the nitric acid with ammonia and finally adding excess ammonia so as to form an ammonia-ammonium nitrate solution. The ammonia-ammonium nitrate can be prepared so that it shows no tendency to crystallize out and from the standpoint of cost and ease of handling is often preferred to ammonium sulphate or liquid anhydrous ammonia as an available nitrogen source. Two commercially available ammonia-ammonium nitrate solutions which are typical of those commonly used are Nitrogen Solution 2A and Nitrogen Solution 3. Their analyses are:

| | Total N, percent | Ammonium Nitrate | Free NH³, percent | Water, percent |
|---|---|---|---|---|
| Nitrogen Solution 2A | 40.6 | 65.0 | 21.7 | 13.3 |
| Nitrogen Solution 3 | 40.8 | 55.5 | 26.0 | 18.5 |

Ammonia-ammonium nitrate solutions are especially favored as fertilizer additives because of their low cost. They may be combined with the superphosphate-containing solid materials used in fertilizers by simply spraying the solution into the mixer wherein the solid materials are being tumbled. The ammonia-ammonium nitrate solutions are added in quantities such that the free ammonia supplied is in stoichiometric relationship to the calcium di-hydrogen phosphate in the superphosphate. Calcium di-hydrogen phosphate ($Ca(H_2PO_4)_2$), constitutes about 28 to 32% of the total single superphosphate weight and is consequently the main phosphorous bearing ingredient in this type of super. Thus, the $P_2O_5$ content of single superphosphate is in the range 17% to 20%. The reaction occurring when the amount of solution is limited to the stoichiometric requirements of ammonia is as follows:

$$Ca(H_2PO_4)_2 + 2NH_3 + CaSO_4 \rightarrow 2CaHPO_4 + (NH_4)_2SO_4$$

In the event that more ammonia is added to single superphosphate than is represented by the above equation, tri-calcium phosphate and hydroxy-apatite are formed. Both of these compounds contain phosphorous in a relatively unavailable state and are of little agronomic value.

This, of course, drastically limits the amount of nitrogen which can be added to single superphosphate by neutralization with a solution of ammonia-ammonium nitrate. For example, 1,000 pounds of single superphosphate containing 32% calcium dihydrogen phosphate and 20% $P_2O_5$ can be treated with no more than 47.5 pounds of ammonia. Solution 2A contains 21.7% free ammonia and 40.6% total nitrogen. Since 47½ pounds of free ammonia is contained in 219 pounds of the solution, whose total nitrogen content is 40.6%, then a total of about 90 pounds of nitrogen (219 × 0.406) may be added by this means without developing the unavailable tri-calcium phosphate and hydroxy-apatite as set forth above. This limits the nitrogen to $P_2O_5$ ratio obtainable by the neutralization of single superphosphate with nitrogen solution 2A to .45 to 1.0 or about 9 to 20.

A similar situation obtains in the case of triple superphate which contains about 45% $P_2O_5$ and which is ammoniated according to the following equation:

$$Ca(H_2PO_4)_2 + 2NH_3 \rightarrow CaHPO_4 + (NH_4)_2HPO_4$$

Additional ammoniation beyond this point yields the unwanted tri-calcium phosphate. It can be shown in the manner set forth above relative to single superphosphate that the maximum ratio of nitrogen to available $P_2O_5$ is in the order of .45 to 1. This is, of course, discounting the small amount of additional ammonia nitrogen which will be absorbed by any free phosphoric acid which may be present. Since this acid will generally be present in amounts in the vicinity of 2–3% of the superphosphate weight, it has only a minor effect on the amount of nitrogen absorbed.

Theoretically, other acid substances may be added to a superphosphate or a mixture containing it to absorb free ammonia and enable the increasing of the nitrogen to $P_2O_5$ level in the product. This, of course, would allow for the use of additional ammonia-ammonium nitrate solution. However, the commonly used fertilizer acid, sulfuric acid, has been found to be unsuitable for use in this fashion. When sulfuric acid contacts the ammonium nitrate in the ammonia-ammonium nitrate solution—prior to its neutralization by the free ammonia—the nitrate salt is decomposed into ammonium sulfate, nitrogen peroxide gas and free oxygen. The nitrogen peroxide is substantially entirely non-recoverable in the usual type of fertilizer manufacturing equipment and represents an economic loss as well as a hazard due to its noxious nature.

It has also been observed that in addition to promoting decomposition of the ammonium nitrate, concentrated sulfuric acid attacks potassium chloride, the usual source of potash used in complete mixed goods. The potassium chloride reacts with sulfuric acid to form potassium sulphate and highly volatile hydrochloric acid. The latter then combines with any free ammonia present to form ammonium chloride. The result is a further loss of nitrogen in the form of an ammonium chloride aerosol. Furthermore, gaseous hydrochloric acid in the presence of moisture severely corrodes the metallic components of the mixing equipment.

It is therefore an object of this invention to provide a process which makes possible the neutralization of ammonia-ammonium nitrate with a sulphuric acid derivative without the aforementioned decomposition of the ammonium nitrate and consequent loss of nitrogen.

It is a further object of this invention to provide a method for incorporating substantial amounts of available nitrogen in plant foods through the use of ammonia-ammonium nitrate solutions.

Another object is to provide for the neutralization and fixation as a solid of the free ammonia in ammonia-ammonium nitrate by a process which not only avoids the decomposition of the ammonium nitrate, but additionally prevents decomposition of any potassium chloride in the fertilizer solids.

Still another object of this invention is to produce a mixed plant food of high nitrogen content wherein the nitrogen is derived entirely from ammonia-ammonium nitrate solutions and one or more sources of free ammonia, thereby eliminating any necessity for the more expensive solid forms of nitrogen, such as ammonium sulphate, solid ammonium nitrate, etc.

Broadly, this invention is the result of a discovery that sulphuric acid may be treated prior to using it as a neutralizing agent for the ammonia-ammonium nitrate to inhibit its activity and thereby prevent decomposition of both the aforementioned ammonia-ammonium nitrate and potassium chloride. The acid is partially neutralized with anhydrous or aqua ammonia to form ammonium acid sulfate before such time as it contacts the ammonia-ammonium nitrate and/or potassium chloride. Ammonium acid sulfate is entirely adequate to perform the desired neutralizing function but at the same time is sufficiently inactive so as not to attack the other materials present.

More specifically, it is the first hydrogen in sulphuric acid which is responsible for the unusually high activity of the raw acid. That is, it is this hydrogen which causes the attack on ammonium nitrate and potassium chloride. The second hydrogen, however, is considerably less active. It has an ionization constant of only about $1.2 \times 10^{-2}$ as compared with $4 \times 10^{-1}$ for the first hydrogen.

It is seen that these constants bear the relation of one to the other of about 33 to 1. Therefore, by "taming" the acid by allowing the first hydrogen to combine with free ammonia, it is possible to retain the acid properties in a considerably milder form and thereby secure a substance which is suitable for neutralizing the excess ammonia of ammonia-ammonium nitrate and forming additional ammonium sulphate in situ.

The ammonium-acid sulphate may be readily manufactured by reacting one mol of sulphuric acid with one mol of anhydrous ammonia in a suitable reaction chamber—a chamber rigid enough to withstand a violently exothermic reaction of this type. A suitable method and apparatus which may be recommended is that set forth in the co-pending application, Serial No. 498,567, filed April 1, 1955, by Derrick H. Stassfort. Alternatively, ordinary aqua ammonia may be used instead of anhydrous ammonia in the above reaction. A suitable method and apparatus which may be employed when aqua ammonia is used is that set out in U.S. Patent 2,755,176. The resulting ammonium acid sulphate is then contacted with the ammonia-ammonium nitrate solution in such ratio that the free ammonia in the solution and the ammonium sulphate are equal molar resulting in a mixture of ammonium sulphate and ammonium nitrate, both of which are excellent sources of available nitrogen.

An example is set out below showing the successful combination of single superphosphate, ammonia-ammonium nitrate solution, anhydrous ammonia and sulfuric acid to provide a nitrogen to $P_2O_5$ ratio of about 1:1 without decomposition of the ammonium nitrate in the ammonia-ammonium nitrate solution. The example is purely for illustrative purposes and is not to be construed as imposing limitations on the scope of the invention other than as are set forth in the appended claims.

*Example*

One thousand pounds of single superphosphate analyzing 20% available $P_2O_5$ was charged into a rotary mixing drum. Ammonium acid sulfate was then formed by combining equal molar portions of 60° Bé. sulfuric acid (305 lbs.) and anhydrous ammonia (41 lbs.) in a reaction chamber within the mixing drum. A suitable form of reaction chamber is described in the co-pending application No. 498,567, filed April 1, 1955, entitled "Plant Food Reactor" by Derrick H. Stassfort. Next, 406 lbs. of ammonia-ammonium nitrate solution No. 2A was sprayed into the tumbling mass on which the ammonium acid sulfate had been deposited. The free ammonia in the ammonium nitrate solution combined with the ammonium acid sulfate in the following manner:

$$NH_4HSO_4 + NH_3 \rightarrow (NH_4)_2SO_4$$

No nitrogen peroxide was evolved as the ammonium acid sulfate did not decompose the ammonium nitrate before the former compound was neutralized by the free ammonia.

The following tabulation illustrates the combination effected:

|  | Wt. Lbs. | Lbs. $P_2O_5$ | Lbs. N |
| --- | --- | --- | --- |
| Superphosphate (20% avail. $P_2O_5$) | 1,000 | 200 |  |
| Ammonium Acid Sulphate: |  |  |  |
| Anhydrous Ammonia (82.25% N) | 41 |  | 34 |
| 60° Bé. Sulphuric Acid (77.67% $H_2SO_4$) | 305 |  |  |
| Ammonia-Ammonium Nitrate Solution #2A (40.6% N, 21.7% free $NH_3$) | 406 |  | 164.8 |
| Total Plant Food |  | 200 | 198.8 |

It is seen from the above that the nitrogen to $P_2O_5$ ratio has been raised substantially from the usual .45 to 1—it is now virtually 1 to 1. If a ratio of nitrogen to $P_2O_5$ greater than 1 to 1 is desired, an increased amount of ammonium acid sulphate may be formed by increasing the weights of sulfuric acid and free ammonia in the above illustrations, and thereafter adding ammonia-ammonium nitrate solution in an amount to supply the necessary free ammonia for conversion of ammonium acid sulphate to normal ammonium sulphate.

The nitrogen to $P_2O_5$ ratio may be raised in ammoniated triple superphosphate in similar fashion.

As indicated above, the neutralization of the ammonia-ammonium nitrate is preferably conducted in the presence of additional fertilizer materials, thus mitigating the violence of the reaction between the free ammonia and the sulphuric acid. The process is especially suitable for use in the presence of potash salts since it does not result in the breakdown of this material and the evolution of hydrochloric acid. However, certain of the advantages will be achieved even in the absence of potash or other solid materials. Also, while batch operations have been detailed, it is entirely possible to conduct the neutralization in a continuous fashion. Apparatus of the type set forth in the Davenport Patent No. 2,618,546 may advantageously be employed.

Obviously, many modifications and variations of the invention as hereinbefore set forth may be made without departing from the spirit and scope thereof, and therefore only such limitations should be imposed as are indicated in the appended claims.

We claim:

1. A process for the manufacture of mixed fertilizers which comprises reacting equimolecular proportions of sulfuric acid and ammonia to form ammonium acid sulfate, mixing the ammonium acid sulfate with fertilizer solids containing superphosphate, and adding to the resulting mixture ammonia-ammonium nitrate in an amount to furnish sufficient ammonia to convert the ammonium acid sulfate to ammonium sulfate and to ammoniate the superphosphate to produce a mixed fertilizer having a ratio of nitrogen to $P_2O_5$ greater than about 0.45 to 1 and containing ammonium sulfate, ammonium nitrate, and ammoniated superphosphate.

2. In the manufacture of mixed fertilizers wherein an ammonia-ammonium nitrate solution is reacted with ammonium acid sulphate in the presence of superphosphate to increase the fixed nitrogen content, the improvement which comprises providing an amount of ammonia-ammonium nitrate solution which will yield a ratio of nitrogen to $P_2O_5$ in the product substantially greater than about 0.45 to 1 and reacting the free ammonia in said solution with the ammonium acid sulphate to form ammonium sulphate whereby the original ammonium nitrate content is substantially maintained and a high nitrogen mixed fertilizer is produced.

3. In the manufacture of mixed fertilizers wherein an ammonia-ammonium nitrate solution is reacted with ammonium acid sulphate in the presence of superphosphate to increase the fixed nitrogen content, the improvement which comprises forming said ammonium acid sulphate and reacting the ammonium acid sulphate with said ammonia-ammonium nitrate to form ammonium sulphate whereby decomposition of the ammonium nitrate is substantially avoided, the amounts of ammonium acid sulphate and ammonia-ammonium nitrate being such as to produce a high nitrogen mixed fertilizer having a ratio of nitrogen to $P_2O_5$ in excess of about 0.50 to 1.

References Cited in the file of this patent

UNITED STATES PATENTS

| | | |
|---|---|---|
| 1,931,768 | Moore | Oct. 24, 1933 |
| 2,047,393 | Siems | July 14, 1936 |
| 2,067,931 | Kniskern et al. | Jan. 19, 1937 |
| 2,136,793 | Gabeler et al. | Nov. 15, 1938 |
| 2,415,464 | Crittenden | Feb. 11, 1947 |
| 2,600,253 | Lutz | June 10, 1952 |